A. E. CRABTREE.
INSECT CATCHER.
APPLICATION FILED JULY 26, 1909.
967,883.
Patented Aug. 23, 1910.
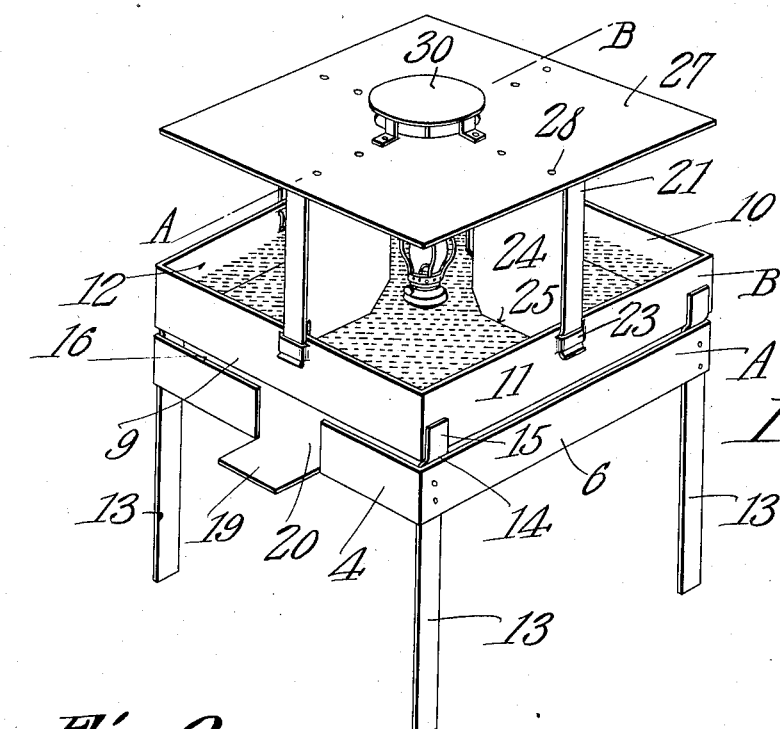
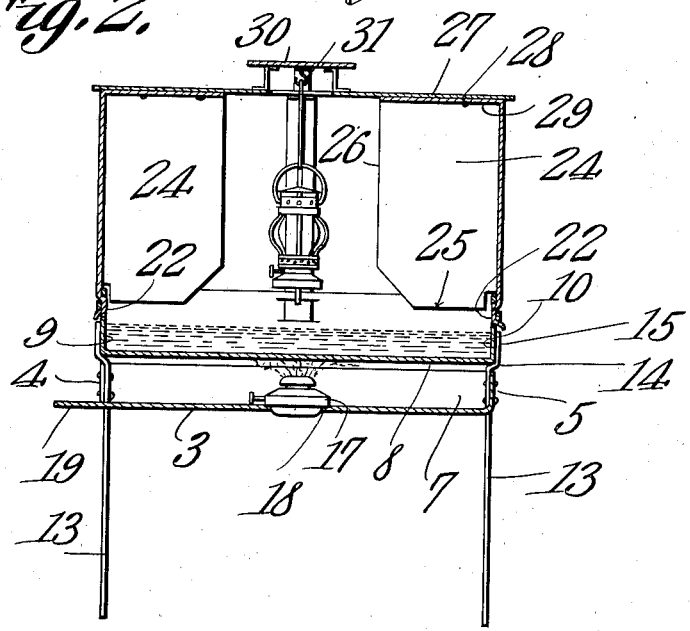
Witnesses
E. G. Stewart
Francis Boyle
Inventor
Allen E. Crabtree.
By C. A. Snow & Co.
Attorneys

UNITED STATES PATENT OFFICE.

ALLEN E. CRABTREE, OF OAK RIDGE, LOUISIANA.

INSECT-CATCHER.

967,883.

Specification of Letters Patent.    Patented Aug. 23, 1910.

Application filed July 26, 1909. Serial No. 509,607.

*To all whom it may concern:*

Be it known that I, ALLEN E. CRABTREE, a citizen of the United States, residing at Oak Ridge, in the parish of Morehouse and State of Louisiana, have invented a new and useful Insect-Catcher, of which the following is a specification.

My invention relates to insect traps and has for an object to provide a device of this character having a series of radial reflector planes which disperse the light from a lamp positioned intermediate their opposed ends so as to attract insects flying at any angular position from the trap.

Another object is to provide a device of this character having a boiler below the reflector planes filled with the heated liquid for destroying the insects thrown downward by the impact of their flight against the reflector planes.

A further object is to provide a device of this character having a heating chamber below the boiler for heating the liquid so that fumes will rise and permeate the atmosphere as an additional attraction for the insects.

With the above advantages and other objects in view which will appear as the nature of the invention is better understood, my invention embraces the novel details of construction and combination of parts illustrated in the accompanying drawing, shown in the following specification and set forth in the appended claim.

In the accompanying drawing, Figure 1 is a perspective view of an insect trap constructed in accordance with my invention. Fig. 2 is a longitudinal sectional view, taken on the line A—B of Fig. 1.

In a more detailed description of my invention in which like characters of reference designate similar parts in the views shown, A designates a heating chamber, and B the boiler. The heating chamber A comprises a bottom 3 from the lateral edges of which rise the vertical side walls 4 and 5, and from the end edges of which rise the vertical walls 6 and 7. The boiler B comprises a bottom 8, adapted to rest upon the upper edges of the side and end walls of the heating chamber, side walls 9 and 10, and end walls 11 and 12 extending in the same plane as the side and end walls, respectively, of the heating chamber.

The heating chamber is raised from the ground by supporting legs 13 which project upward beyond the bottom 3 of the heating chamber and are offset outwardly over the top edges of the side and end walls to provide seats 14 upon which the bottom of the boiler bears. That portion 15 of the legs above the offset portions extends upwardly along the outer wall of the boiler and serve to securely clamp the boiler to the heating chamber. The opening 16 between the bottom of the boiler and top edges of the heating chamber serves as a ventilator or vent to permit the gases rising from the heating member to escape into the atmosphere.

The heating member is preferably a lamp 17 having any preferred form of large area burner, either blue flame or otherwise, and is positioned in an opening or seat 18 formed at substantially the middle portion of the heating chamber bottom, as shown. For removing the lamp for trimming, repairing, etc., a leaf 19 is struck out from one of the lateral walls of the heating chamber an opening 20 being formed thereby through which the air for the proper combustion of the heater enters and through which the heater may be readily removed from the heating chamber when desired.

The boiler is preferably filled with a liquid steeped from the stems or seed of the various vegetables upon which the insects feed, as it is thought that the aroma from the vapor rising from the boiler when in operation will permeate the atmosphere and attract the species of insects accustomed to feed upon the plant from which the liquid is obtained.

It is evident that a device of this kind may be used for attracting and destroying insects by daylight as well as at night.

Secured to the lateral and end walls of the boiler are a plurality of standards 21 which are preferably positioned intermediate the corners of the walls and secured in this position in any desired manner, the connection in this instance being shown by passing the offset terminals 22 of the standards through eyes 23 struck from the side walls and end walls.

Reflector planes 24 are secured to the standards and extend in radial planes toward the center of the boiler. The lower edges 25 of the plane are spaced a sufficient distance above the bottom of the boiler so as not to be dampened by the bubbling of the boiling liquid or from external causes, such as a breeze stirring the surface of the liquid. The opposed inner edges 26 of the reflector planes are spaced a sufficient distance apart to permit the insertion therebetween of a luminous member. The reflectors may be made of cloth, polished wood, mirrors or any other material that will disperse the rays of light falling upon it.

The luminous member may be a lantern, as here shown, and is supported within the boiler at substantially the center thereof. It is evident that the rays from the lantern strike equally upon each of the eight faces of the reflector planes and inasmuch as the planes radiate from the source of the rays, the light will be reflected in every direction so that insects flying at any angular position whatever from the light will be attracted thereby. The primal function of the reflector planes is to attract the insect, but it is evident that the insect in its flight toward the light will strike forcibly against the reflector plane in the path of his travel and be hurled down into the heated liquid in the boiler beneath.

A top 27 is secured to the outward portions of the standards 21 and connects the top edges of the reflector planes. The top may be secured to the standards in any desired manner, the connection here being shown by rivets or bolts 28 passing through the cover and inwardly projecting flanges 29 of the standards. The top serves to prevent the upward escape of insects swarming within the confines of the boiler and also prevents rain from extinguishing the lantern during heavy storms.

A ventilator 30 may be secured to the cover if desired, and may be provided with a hook or similar connector 31 for suspending the lantern; however, it is not intended to limit the securing of the lantern within the boiler to this construction as the lantern may be supported upon the bottom of the boiler and work equally as effectively.

From the foregoing description, taken in connection with the accompanying drawing, it is thought that the construction and operation of my invention will be easily understood without a more extended explanation, it being understood that various changes in the form, proportion and minor details of construction may be made without sacrificing any of the advantages or departing from the spirit of the invention.

What is claimed is:

An insect trap comprising a shallow, open-top casing adapted to contain a burner, a tank above the casing having its bottom wall spaced from the top edges of the casing to promote the travel of heat currents along the tank bottom, a lamp above the tank, reflector planes carried by the tank and extending toward, without overlying or underlying any portion of, the lamp; and a top connecting the reflector planes and operating to support the lamp above the liquid level of the tank.

In testimony that I claim the foregoing as my own, I have hereto affixed my signature in the presence of two witnesses.

ALLEN E. CRABTREE.

Witnesses:
M. T. LIMERICK,
E. B. FOLSE.